Patented Dec. 26, 1933

1,941,058

UNITED STATES PATENT OFFICE 1,941,058

SPIRIT VARNISH

Hermann Schladebach, Dessau in Anhalt, and Herbert Hähle, Dessau-Ziebigk, Germany, assignors to General Aniline Works, Inc., New York, N. Y., a corporation of Delaware No Drawing. Application August 13, 1928, Serial No. 299,456, and in Germany August 19, 1927

5 Claims. (Cl. 134—26)

The present invention relates to spirit varnishes colored or to be colored fast to light, and to the manufacture thereof.

It has not hitherto been possible to color spirit varnishes, that is to say solution of natural or artificial resins in spirit with or without addition of a softening agent or some other substance, by means of a basic dyestuff so that the color is fast to light.

According to this invention, such varnishes can be made suitable for being colored fast to light or may be colored fast to light if, before, together with or after the addition of the basic dyestuff, there is added a small proportion of a compound which prevents change of the dyestuff by the varnish under the influence of light. Such compounds are metal-nitrates soluble in spirit varnishes, for example nitrates of calcium, strontium, bismuth, thorium, uranium and cobalt. The colored varnishes thus obtained give on paper, wood, metal and other substances, coatings which are highly lustrous, clear and of essential better fastness to light than those obtained by means of the usual spirit varnishes colored with the same dyestuffs. The invention renders it possible to use the extraordinarily bright triarylmethane-dyestuffs which are very unstable in themselves in spirit varnishes, even in cases which demand a very high degree of fastness to light in the varnish.

The following examples illustrate the invention, the parts being by weight:—

Example 1.—In 100 parts of warm commercial spirit varnish (containing as essential part a resin, for instance shellac) there are dissolved 0.25 parts of Victoria blue B, highly concentrated, whereupon 0.5 part of uranylnitrate is added. The varnish is colored blue fast to light.

Example 2.—10 parts of crystal violet 6B are mixed with 20 parts of thorium nitrate. 0.75 part of this mixture is dissolved in 100 parts of commercial spirit varnish with application of heat. The varnish is colored fast to light.

It is obvious to all skilled in the art that the invention is not limited to the foregoing examples or to the details given therein. Other basic dyestuffs or other metal-nitrates soluble in spirit varnish mentioned above may be used. The order in which the ingredients are added to the varnish may be varied without changing its qualities. The quantities of nitrates soluble in spirit varnish used may be varied in wide limits but we prefer to use it in quantities less than 1 per cent. calculated on the quantity of spirit varnish.

In the claims following hereafter, the term "spirit varnishes" is intended to cover only the true spirit varnishes, namely, solutions of resins from which the resin film is produced by evaporation of the spirit used as solvent for the resins.

What we claim is:

1. Colored spirit varnishes fast to the action of light containing a basic dyestuff and a spirit-soluble metal-nitrate.

2. Colored spirit varnishes fast to the action of light containing a basic dyestuff and uranylnitrate.

3. Colored spirit varnishes fast to the action of light containing a basic dyestuff of the triarylmethane series and uranylnitrate.

4. In the manufacture of spirit varnishes colored with a basic dyestuff the step which comprises adding to the varnish at any stage of manufacture a spirit-soluble metal-nitrate.

5. In the manufacture of spirit varnishes colored with a basic dyestuff the step which comprises adding to the varnish at any stage of manufacture uranylnitrate.

HERMANN SCHLADEBACH.
HERBERT HÄHLE.